United States Patent
Edelson

(10) Patent No.: US 11,791,674 B2
(45) Date of Patent: Oct. 17, 2023

(54) MOTOR DESIGN AND WINDING METHOD

(71) Applicant: Borealis Technical Limited, North Plains, OR (US)

(72) Inventor: Jonathan S. Edelson, Springfield, MA (US)

(73) Assignee: Borealis Technical Limited, Isle of Man (IM)

( * ) Notice: Subject to any disclaimer, the term of this patent is extended or adjusted under 35 U.S.C. 154(b) by 262 days.

(21) Appl. No.: 17/142,833

(22) Filed: Jun. 1, 2021

(65) Prior Publication Data

US 2021/0210999 A1   Jul. 8, 2021

Related U.S. Application Data

(60) Provisional application No. 62/957,679, filed on Jan. 6, 2020.

(51) Int. Cl.
| | |
|---|---|
| *H02K 1/16* | (2006.01) |
| *H02K 15/10* | (2006.01) |
| *H02K 15/085* | (2006.01) |
| *H02K 15/02* | (2006.01) |

(52) U.S. Cl.
CPC ........... *H02K 1/165* (2013.01); *H02K 15/024* (2013.01); *H02K 15/085* (2013.01); *H02K 15/10* (2013.01)

(58) Field of Classification Search
CPC ...... H02K 1/165; H02K 15/085; H02K 15/10; H02K 15/024; H02K 1/265; H02K 17/165; H02K 3/48
See application file for complete search history.

(56) References Cited

U.S. PATENT DOCUMENTS

| | | | |
|---|---|---|---|
| 7,159,296 B2 | 1/2007 | Miya et al. | |
| 2005/0116574 A1* | 6/2005 | Neet | H02K 15/024 310/214 |
| 2011/0012467 A1 | 1/2011 | Blissenbach et al. | |
| 2012/0169174 A1* | 7/2012 | Radov | H02K 1/148 310/216.008 |
| 2014/0292123 A1 | 10/2014 | Stephenson et al. | |
| 2016/0056697 A1 | 2/2016 | Hashimoto et al. | |

FOREIGN PATENT DOCUMENTS

EP         0300436 A2     1/1989

OTHER PUBLICATIONS

Windings Electromagnetic Solutions, Slot Fill and Design for Manufacturabilitym 2019 (www.windings.com/technical-reference/slot-fill-and-design-for-manufacturability/).

* cited by examiner

*Primary Examiner* — Leda T Pham

(57) ABSTRACT

A stator core design and motor winding method maximizing slot fill are provided. A stator core ring section and open U-shaped slot elements are each formed of multiple layers of lamination steel. Laminations forming the slots have a U-shaped profile corresponding to that of the slots. A straight portion of each lamination adjacent to the slot opening is folded to form stator teeth. Laminations forming the ring section and the slots may have a uniform or variable axial thicknesses and materials. A movable jig configures conducting wire and insulating material into a desired configuration for insertion into the open slots, fills each slot with the wire and insulating material, and partially crimps the open end of the filled slot, leaving an opening. When all slots are filled, the stator core is compressed to a final diameter, inserted into a ring-shaped stator element, and sealed to form a complete stator assembly.

20 Claims, 6 Drawing Sheets

100
Forming an electric motor stator core component with a ring section and a plurality of open U-shaped slot elements each formed from multiple laminations of lamination steel. Laminations adjacent to each of the open U-shaped slots have a U-shaped profile curved to correspond to the U-shape and with opposed sides extending toward the stator central opening that are folded to form stator teeth. The lamination materials and thicknesses forming the ring section and the slot elements may be uniform or may vary.

110
On a movable jig creating a squirrel cage arrangement of copper wire and insulating material in an optimal configuration required to fill the slots in the stator core component

112
Moving the movable jig from slot to slot, spreading open ends of the slots one at a time or, alternatively, increasing spacing between a number of slots in a region on the stator core component

114
Exposing the squirrel cage arrangement of copper wire and insulating material in the optimal configuration on the jig, and filling each of the slots with the arrangement of copper wire and insulating material as the jig is moved from slot to slot

116
When each slot is filled, crimping the open end of each slot to partially close the end and change the shape of the slot from a U-shape to a teardrop shape

118
After all slots are filled with the wire and insulating material and the open ends are crimped, compressing the stator core component with the jig to a final diameter, inserting the stator core component into a stator ring element to form the completer stator assembly, and sealing the stator assembly

FIG.8

MOTOR DESIGN AND WINDING METHOD

PRIORITY CLAIM

This application claims priority from U.S. Provisional Patent Application No. 62/957,679, filed 6 Jan. 2020, the entire disclosure of which is fully incorporated herein in its entirety.

TECHNICAL FIELD

The present invention relates generally to motor designs and winding methods for electric motors and specifically to a stator core design and to a method for motor winding in the stator core design that promotes slot fill and efficient use of motor winding materials.

BACKGROUND OF THE INVENTION

Electric motors are used in a wide range of applications to convert electrical energy into mechanical energy in the form of motion. A stator core component in the motor is wrapped with conductors, usually in the form of copper wire coils, which produces a magnetic field to interact magnetically with a rotor or other moving element. Most commonly motor output is in the form of rotary motion.

Motor torque output is related to the current flowing through the coils. Motor speed is related to the voltage necessary to cause such current flow. Coil winding requirements of a motor depend upon the application requirements for the electric motor. One of the challenges encountered in winding motors is the trade-off between slot fill, which is the portion of the stator slot that actually contains copper wire rather than empty space, and the difficulty of inserting the copper wire.

Although the stator in an electric motor is stationary, it provides the driving forces that rotate the rotor. Stator configurations may vary for different motor applications and generally have a "core" formed from laminations of steel or other magnetic material. This core provides the path for magnetic flux threading through the stator. Generally, slots are formed in this core to provide locations for coils of electrical conductor. Current passing through the conductive coils creates the magnetic field used for the operation of the motor.

In general, the more space used for conductive coils, the lower the conductive losses in the motor. However, space used for slots necessitates less material available for carrying magnetic flux. Optimizing the coil current handling versus core flux handling presents a number of design and engineering challenges.

In addition to physical design limitations, other challenges may include the amount of slot fill appropriate for the motor application and manufacturing limitations. The slot fill factor, which may be defined as the ratio of the cross-sectional area occupied by copper wire inside a stator slot to the total amount of available space in an empty stator slot, is an important factor in determining torque output. Theoretically, 100% slot fill will produce a maximum possible torque output of the motor, and in an ideal situation 100% slot fill would mean that there would be no empty space in the slot. Such a design, however, has been stated to be impossible to build, and it has been further stated that the slot fill ratio will always be less than one.

Typically, copper wire accounts for about 65% of the total slot fill in a random wound electric motor. Insulating slot liners, wedges, and phase separators within each slot also take up space in the slot, and insulation on copper wires may reduce the amount of cross-sectional area of the slot that is actually conductive. The round copper wire used for coil windings may also leave gaps when it is wound. While slot fill higher than 65%, desirable in applications where power density is critical, is acknowledged to be possible, this is difficult to achieve without increased manufacturing complexity, cost, and quality issues. To achieve slot fill above 80%, specialized tooling may be required to ensure that slot components are inserted without damaging the copper wire or its insulation, and manufacturing time may be significantly longer than with lower slot fill designs.

The design of slot openings and the wire diameter may also affect slot fill. Coils of wire are typically inserted from the inside diameter of the stator into the slots. While wire coils are more easily inserted into a large slot opening, a larger slot opening may negatively affect flux path. Small slot openings may be difficult to pass the wire through and may require winding the wire into the slots turn by turn, which may reduce maximum possible slot fill as a result of limited space for tooling. Slot shape may also affect the amount of wire, insulation, and other material that u ill fit in a slot.

Commonly used slot shapes include a flat bottom slot with squared or rounded corners and a rounded bottom slot shape, which have open tops, and a "teardrop" shape with a rounded or curved bottom and a more closed top. Rounding corners and the bottom of a slot may allow slot liners to conform to a consistent surface and wire to fill in more space around slot edges, provided the radius of the curve is optimized. Open top slot designs are well known to facilitate coil insertion; however these are most suitable for larger "formed coil" machines, not for the scale of random wound machines described herein.

There is a need for a for a stator core design and for a motor winding method that both maximize stator slot fill and facilitate wire insertion in stator slots of an electric motor stator without the adverse effects described above.

SUMMARY OF THE INVENTION

It is a primary object of the present invention to provide a stator core design and a motor winding method for an electric motor that both maximize stator slot fill and facilitate wire insertion in stator slots in the motor stator.

It is another object of the present invention to provide a stator core design and a motor winding method for an electric motor that achieve a stator slot fill approaching 100%.

It is another object of the present invention to provide a multiple layer stator core component with slot elements designed with an open U-shape that is closable.

It is another object to provide a multiple layer stator core component with an arrangement of foldable laminations positioned adjacent to each open U-shaped slot.

It is an additional object of the present invention to provide a multiple layer stator core component with laminations that may have varying axial thickness, the laminations adjacent to a plurality of radial open U-shaped slots being thinner than the laminations located in a stator component into which the slots are inserted.

It is a further object of the present invention to provide a motor winding method that employs a movable jig to produce a stator configuration of conducting wire and insulating materials on the jig prior to its insertion in the stator slots and then inserts the conducting wire and insulating materials into the slots and at least partially closes the open ends of the slots.

In accordance with the aforesaid objects, a stator core component is formed from multiple layers, preferably of a lamination steel, to have a plurality of radial slot elements, each with an open U shape. The laminations adjacent to the open edges of each U-shaped slot element are curved to correspond to the curved U-shape of the slot elements and folded to form stator teeth. The laminations forming the stator core component may have a uniform axial thickness. Alternatively, the laminations may have a varying axial thickness in the direction from the slot openings to an outer edge of the stator core so that the laminations are thinner adjacent to the slots and thicker adjacent to the outer edge.

A motor winding method is provided that employs a movable jig to configure a combination of conducting wire and insulating material into a functional stator configuration on the jig prior to inserting the configured combination of conducting wire and insulating material into each open U-shaped slot element. The jig may be used to spread the slot elements, and a slot element is placed around a combination of conducting wire and insulating material. The open end of the U-shaped slot element may be crimped partially closed, creating a slot opening. When all slot elements have been wrapped around combinations of conductors and insulating material and the openings crimped, the stator core component is compressed to a final diameter and inserted into a stator ring to form a stator assembly. An adhesive may be used to seal the stator assembly components.

Additional objects and advantages will be apparent from the following description, claims, and drawings.

BRIEF DESCRIPTION OF THE DRAWINGS

FIG. 8 is a flow chart describing the steps of the motor winding method of the present invention.

DESCRIPTION OF THE INVENTION

As noted above, motor winding challenges involve a trade-off between slot fill and wire insertion difficulty. In an ideal situation, stator slots would have no empty space and would be completely filled with conductive wire, which avoids the slot space occupied primarily by magnetic steel-carrying flux. A motor that has completely filled stator slots cannot be built using conventional techniques since it would be difficult to insert wire into slots and then bend the wire as required to pass to an adjacent set of coils. The present invention provides a stator core component and a method that overcomes these challenges to achieve greater slot fill than has heretofore been achieved and permits more efficient use of expensive materials.

As used herein, the term "winding" refers to electric conductors, including copper wires and coils, that are inserted into stator slots and that are interconnected to wrap around a stator component to carry electric current through the stator component to generate magnetic flux used to rotate a rotor in an electric motor. The term "wire" refers to copper wire used as a conductor in the motor windings of the present invention.

As used herein, "lamination(s)" refers to multiple layers of steel and other suitable materials used to form stators and like components for electric motors, whether stacked axially or stacked and folded in accordance with the present invention.

As used herein, the terms "open slot" and "U-shaped open slot" refer to a stator slot element that has a radial opening with a width that is substantially the same as the width of the remainder of the slot when measured in a generally circumferential direction about a central axis of the stator component containing the slots and has a curved or rounded bottom portion.

As used herein, the term "electric motor" refers to a wide range of different types of electric motors, including drive motors mounted to vehicle wheels to power the vehicle wheels and move the vehicle, for example an aircraft, an automobile, or a truck, on a ground surface. The electric motors referred to herein include at least a rotating rotor assembly and a stationary stator assembly and may include other motor components.

Figure 1:
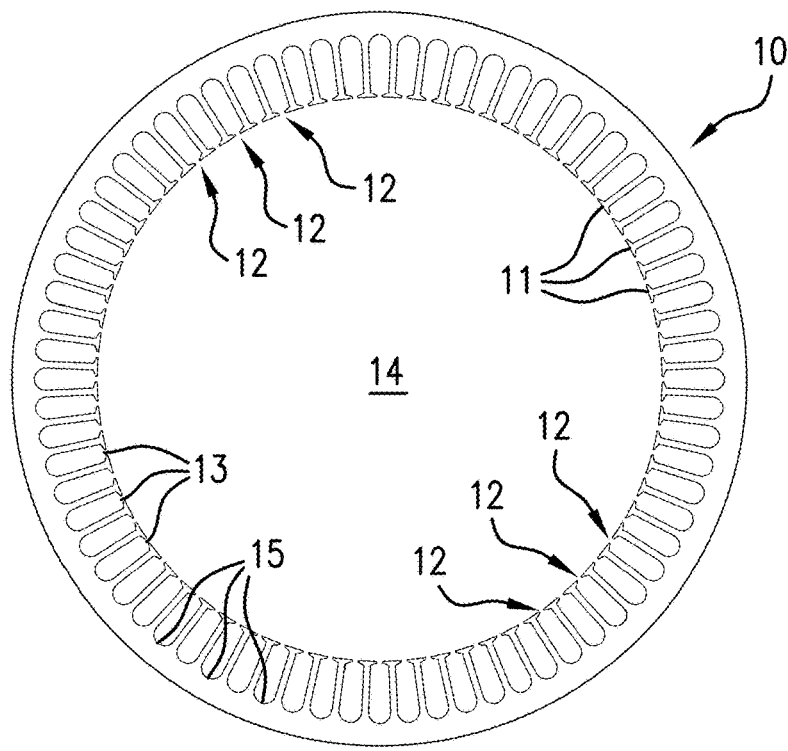
FIG. 1 shows a plan view of a sheet of lamination steel cut with a profile shape used to form a conventional stator core component.
Figure 2:
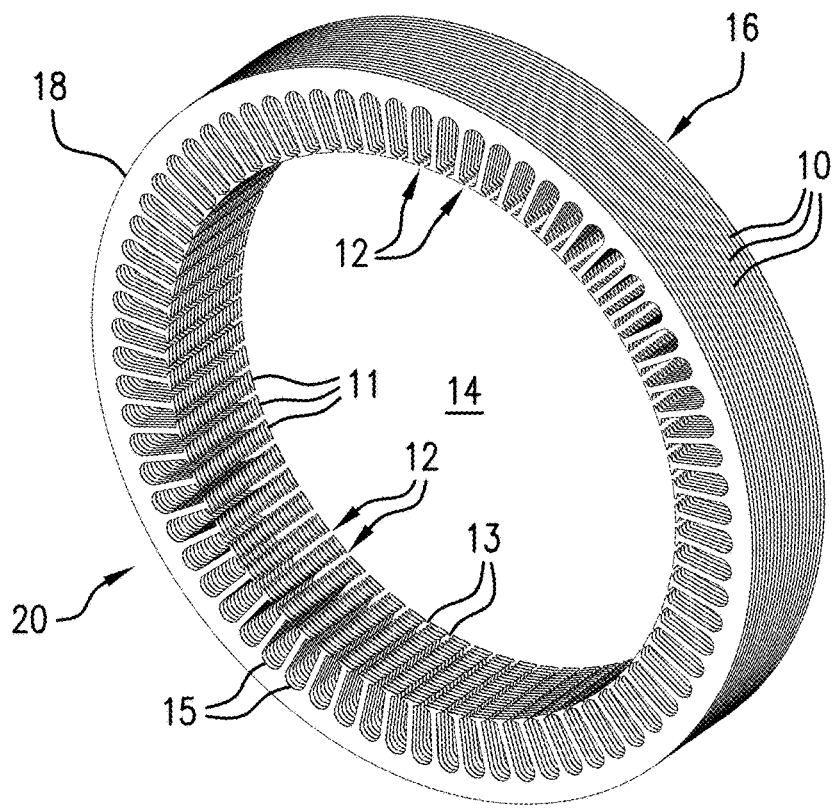
FIG. 2 shows a perspective view of multiple sheets of lamination steel cut with the profile shape of the FIG. 1 sheet stacked axially to form a laminated conventional stator core.

Referring to the drawings, which are not drawn to scale, FIGS. 1 and 2 illustrate features of a conventional stator core. FIG. 1 shows a single sheet of lamination steel 10 cut with one example of a profile shape that can be used to form a conventional stator core. This single sheet of lamination steel 10 is cut to have a profile shape with a plurality of U-shaped radial stator slots 12 positioned circumferentially around a central opening 14. Multiple ones of the single sheet 10 are stacked axially in a lamination stack 16 forming a conventional stator core 20, as shown in perspective in FIG. 2. The number of lamination sheets 10 in the lamination stack forming the stator core 20 will depend on the size of the stator required for a particular motor application. The plurality of circumferential stator slots 12 have open ends 13 oriented toward the central opening 14 and are shown to have rounded bottoms 15, as discussed above. Stator teeth 11 are adjacent to each open end 13. The central opening 14 may receive a rotor assembly (not shown). Each lamination sheet 10 is cut to have the same profile shape, such as the profile shown in FIGS. 1 and 2. A number of the lamination sheets 10 are then stacked, as shown in FIG. 2, so that the lamination stack 16 forms the teeth 11 and the slots 12 of the stator core 20, which extends between the central opening 14 and an outer edge 18 of the lamination stack.

Figure 3:
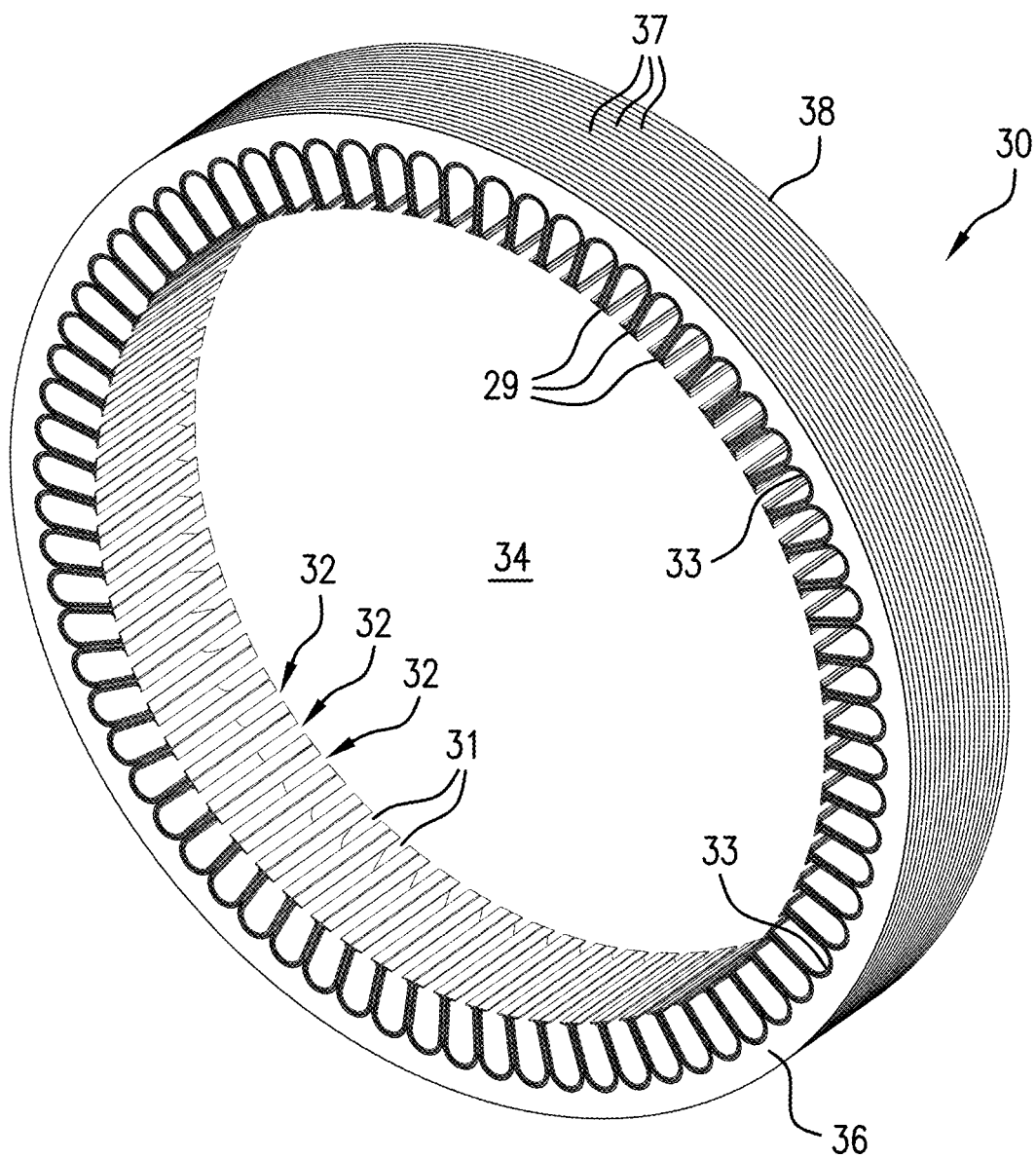
FIG. 3 is a perspective view of a stator core component according to the present invention formed from multiple sheets of lamination steel and having a plurality of radial open U-shaped slot elements.
Figure 4:
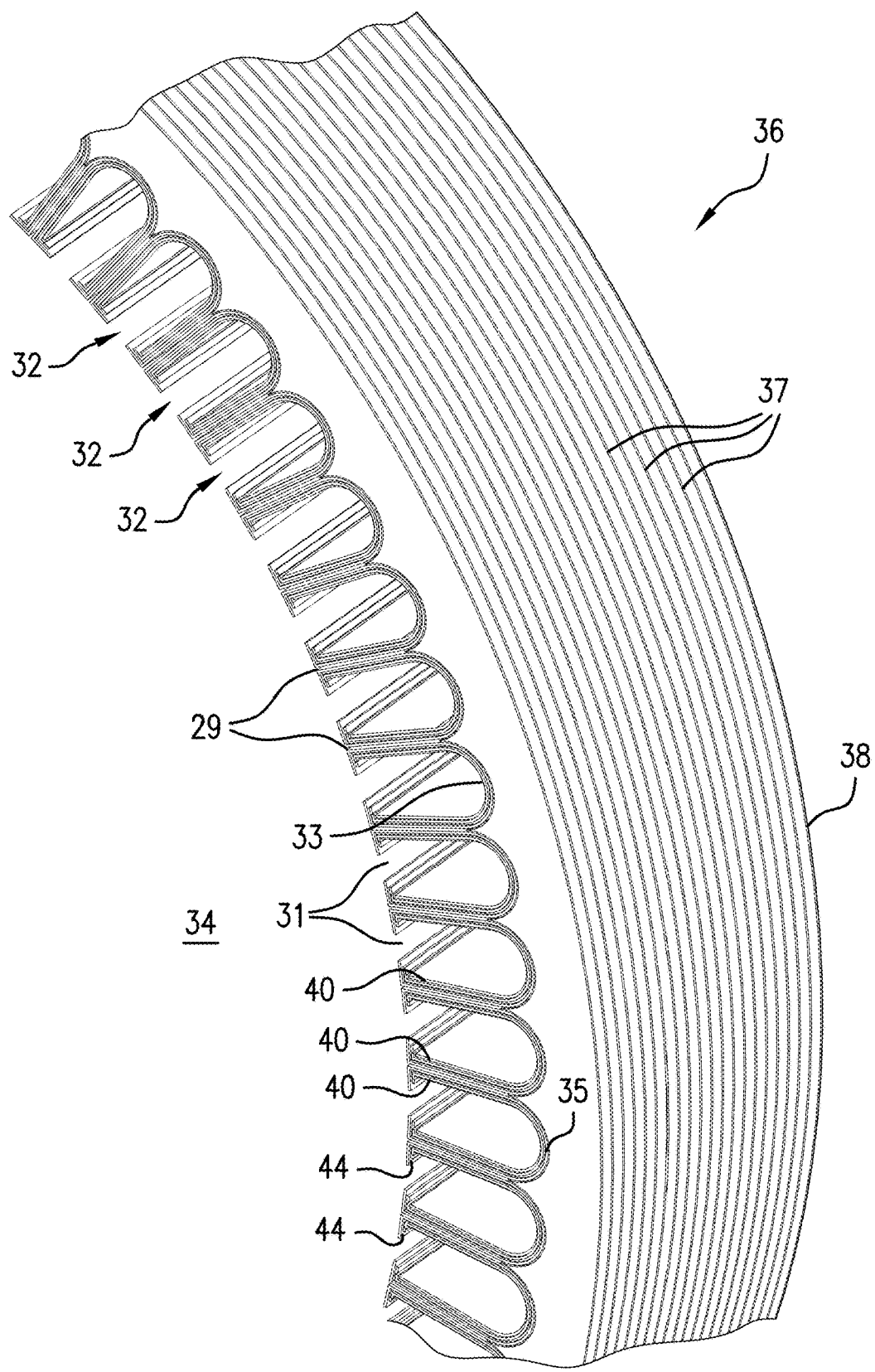
FIG. 4 is an enlarged perspective view of a section of the stator core component of FIG. 3 illustrating in more detail the laminations adjacent to the slot elements and the laminations adjacent to the stator core component outer edge.
Figure 6:
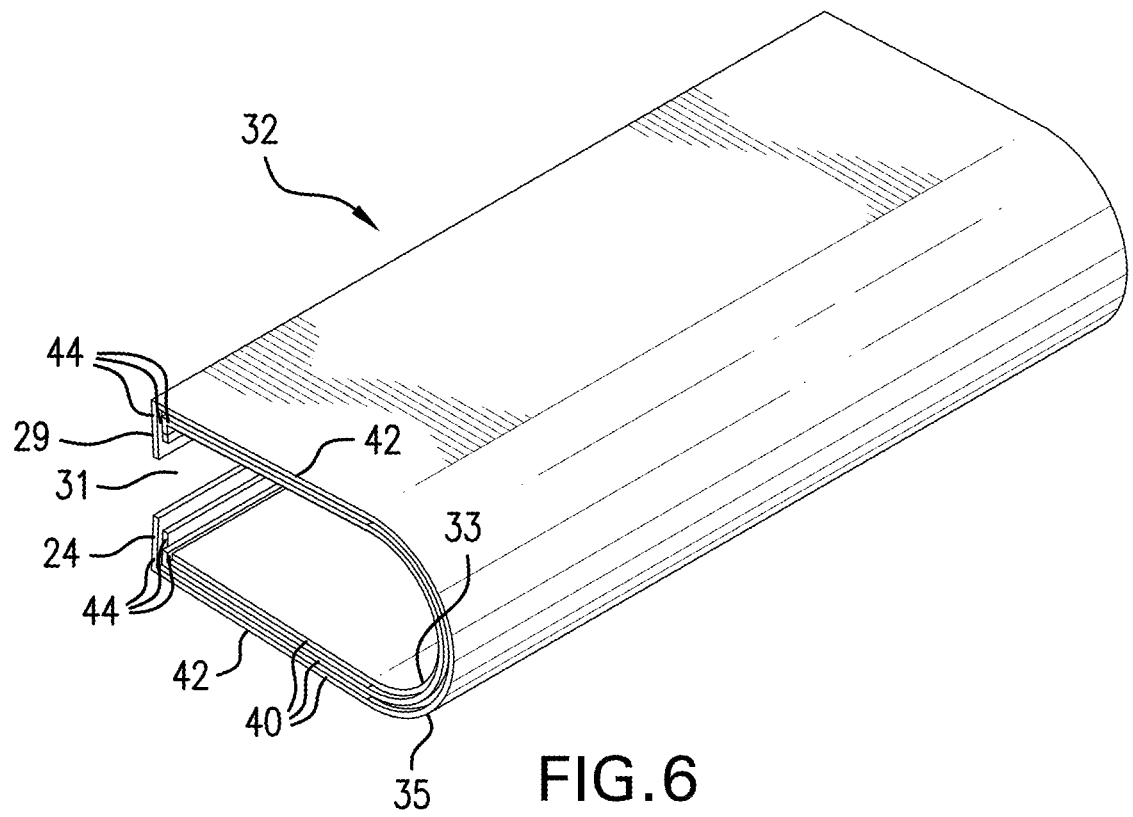
FIG. 6 is a sectional perspective view of a profile an individual slot element showing the foldable laminations around the U-shaped slot opening.

The conventional stator core 20 with the lamination stack 16 shown in FIG. 2 presents the slot fill and other challenges described above. The present invention presents an improved stator stack design for a stator core component with a novel arrangement of laminations and a configuration that produces benefits including greater slot fill and more efficient use of materials. FIG. 3 illustrates a perspective view of a design for a stator core component 30 in accordance with the present invention. The stator core component 30 has a plurality of open stator slots 32, each having the U shape shown, spaced radially about a central opening 34 in the stator core component 30 and extending axially toward a stator core component outer edge 38. Stator teeth 29 are positioned between each slot 32. The configuration of the laminations adjacent to the slot elements is shown in FIGS. 4 and 6 and described in more detail below. As described in detail and shown in connection with FIG. 6, the laminations adjacent to the slot openings 31 may be folded to form the stator teeth 29.

The stator core component has an outer ring section 36 that extends from bottoms 33 of the slots 32 to the outer edge 38. The outer ring section is described below in connection with FIG. 5. The laminations 37 of the outer ring section 36 may be formed to have a uniform axial thickness between the stator slots 32 and the outer edge 38. Alternatively, the stator core component 30 may have defined areas of the laminations 37 that may have different thicknesses. The outer ring section 36 of the stator core component may have laminations 37 that are similar in thickness to those of a conventional stator core component, such as the stator core 20 shown in FIG. 2. The thickness of the laminations adjacent to the slots 32 in the portion of the stator core that extends axially from the outer ring section 36 toward the central opening 34 may be formed to be less than the thickness of the laminations in the outer ring section, so that the laminations of the stator core component 30 have a variable axial thickness. As discussed below in connection with FIGS. 4 and 6, the relative thinness of the laminations around the slots 32 may facilitate the folding of these structures to form stator teeth.

FIG. 4 illustrates an enlarged view of a section of the stator core component 30 of FIG. 3. The profile of the laminations 40 around each slot element 32 is shaped to correspond to the curved or rounded bottom 33 of each U-shaped slot and extend toward the slot openings 31 adjacent to the central opening 34.

Figure 5:
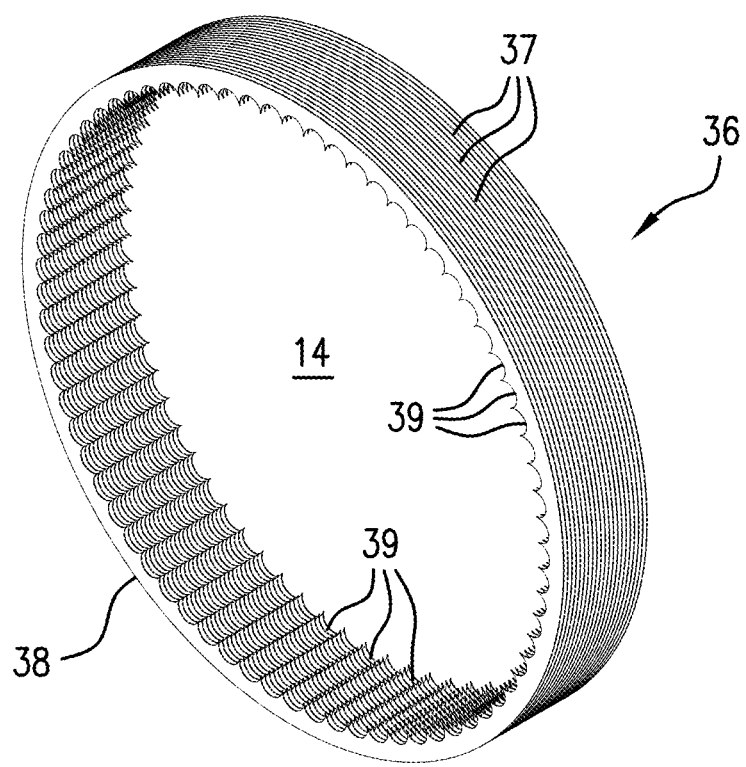
FIG. 5 is a perspective view of an axial section of an outer ring of the stator core component of FIG. 3 showing the curved shape of the laminations contacting rounded bottoms of the slot elements and the outer edge of the stator outer ring.

FIG. 5 is a perspective view of an axial section of the stator core component of FIG. 3 showing the flat stacked laminations 37 in the outer ring section 36 between the slot elements 32 and the outer edge 38 of the stator core component 30. The outer ring section 36 may be formed with semicircular notches 39, rather than stator teeth. The curvature of the semicircular notches 39 corresponds to that of the rounded bottoms 33 of the slots 32 and may contact and hold the folded portions 44 of the slot element laminations 40. As noted above, the thickness of the laminations 37 in the outer ring section 36 may be the same as or greater than that of the thickness of the laminations 40 surrounding each slot 32.

FIG. 6 illustrates a sectional perspective view of a profile of an individual slot element 32 to be inserted into each of the curved sections 39 in the outer ring section 36. The laminations 40 are curved to form an external rounded bottom portion 35, extend toward the U-shaped slot open end 31 and are folded, preferably at right angles to the opposed sides of the U-shaped slot, to form the stator teeth 29. The open end 31 communicates with the central opening 34, and the rounded bottom portion 35 is positioned opposite the open end adjacent to the slot rounded bottom 33 to engage a curved section 39 in the outer ring section 36. Each one of the individual slot elements 32 is inserted into each of the curved sections 39 to form the stator core component 30, as shown in FIGS. 3 and 4 and described above.

As noted, the stator core component 30 may be manufactured out of lamination steel of the type used to form conventional stator laminations, and the outer ring section 36 may be formed in this manner. Instead of being stacked to form the slots and teeth as shown in the conventionally constructed stator core of FIG. 2, however, the laminations 40, which may be the same type of lamination steel used to form the outer ring section 36, are folded to form the slots 32 and the stator teeth 29 as shown in FIGS. 4 and 6. FIGS. 4 and 6 illustrate the curved profile that the laminations 40 adjacent to the slot bottom 33 and sides 42 will follow to form the curvature of each open U-shaped slot. Edges 44 of each of the lamination sheet sections 40 are folded around the slot opening 31, rather than being stacked as in the conventional stator of FIG. 2. The folded edges 44 may be staggered or offset as shown. The stator teeth 29 formed by the overlapping edges 41 of the folded laminations 40 may be stronger and more robust that those formed in a conventional lamination stack. All of the slot elements 32 in the stator core component 30 would be surrounded by folded laminations, as shown in FIGS. 4 and 6, to form a complete set of stator teeth 29. The folded lamination portions 44 may be formed so that the slot 32 has a more open end 31 with less of a bend in the rounded bottom end 33 than is shown in the drawings. The arrangement of the multiple folded layers 44 of the lamination steel around the opening of the slot 32 and a more open end 31 may facilitate expansion and closure of the slots before and after they are filled as described below.

As noted, the stator core 30 has two defined components, the outer ring section 36 shown in FIG. 5, and a plurality of individual slot components, each with the slot structure shown in FIG. 6. These separate components may be formed of different flat stock lamination materials and may have different axial thicknesses. For example, the outer ring section 36 may be formed to have one thickness and may be made of one type of steel alloy. Each of the individual slots 32 may be formed with the configuration shown in FIG. 6 from the same type of steel alloy to have the same thickness as that of the outer ring section 36 so that the stator core component has a uniform thickness and material from the outer edge 38 to the central opening 34. The individual slot elements may also be formed to be thinner and from a different lamination material than the thickness and material of the outer ring section 36. Other illustrative combinations of thickness and alloys that may be used to form the laminations 37 of the outer ring section 36 and the laminations 40 of the individual slot elements include, for example, forming the laminations 37 and 40 of the same alloy to have different thicknesses and forming the laminations 3 and 40 of different alloys to have the same thickness. These examples are not meant to be limiting, and other combinations of lamination materials and thicknesses for laminations 37 and 40 are contemplated to be within the scope of the present invention.

In accordance with the present invention, laminations 40 adjacent to the slot walls 42 are folded, as shown at 44, to form the stator teeth 29. The teeth 29 are often the most magnetically stressed elements in the stator core component and may be made of an alloy that is better suited to withstand such stress. The outer ring section 36, which is not subject to the same stress, made be made of an alloy with different properties. As a further example, the slot element laminations 40, including the folded portions 44 forming the stator teeth 29, may be made of a HIPERCO® alloy, and the laminations 37 of the outer ring section 36 may be made of a silicon steel. The thicknesses of these materials may be uniform or may vary, as noted above Conventional stator lamination stacks, such as stack 20 shown in FIG. 2, may be formed with laminations 16 that are thin in the direction of the axis of rotation of the motor. The desired stack thickness or stack height is provided by the number of sheets, such as sheets 10 shown in FIG. 1, that are stacked to form the stator lamination stack 20. In the stator core component 30 of the present invention, the outer ring section 36 may be formed in the same manner as a conventional stator lamination stack. The slots 32 and stator teeth 29, however, may be formed from laminations 40 that are thinner in the direction that permits them to wrap around the stator conductors (not shown) than the laminations 37 in the outer ring section 36. The total mass of the stator core component 30 may be the same as the total mass of the conventional stator core 20. The total mass of the stator core component 30 may actually be increased, however, because the present invention permits greater fill of the slots 32 than is possible with the slots 12 in the conventional stacked stator core 20.

When the individual slot element 32 shown in FIG. 6, and the remaining individual slot elements in the stator core component 30 are filled with conducting wires and insulation as described herein, the stator core component 30 may be compressed to a final diameter and inserted into a stator ring, as described below, to form a stator assembly. The stator assembly may then be assembled with a rotor assembly in an electric motor.

Figure 7:
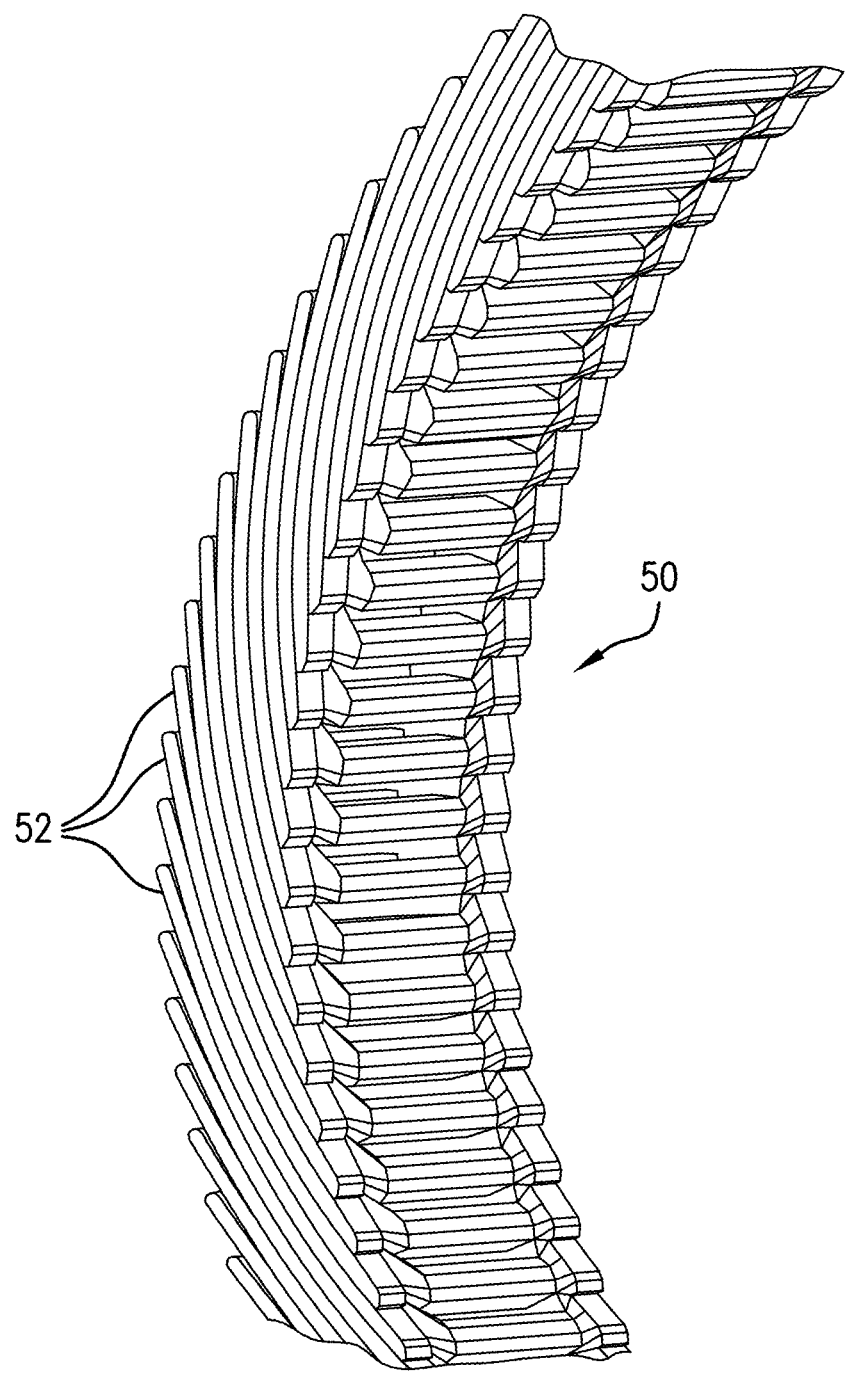
FIG. 7 illustrates one configuration of conducting wire and insulating material that may be used to fill the slot elements in a stator core component in accordance with the present invention.

FIG. 7 illustrates one known winding configuration 50 of copper wire 52 that may be used to fill the slots in a stator core component 30 in accordance with the present invention. This winding configuration may be modified and other configurations of copper wire 52, with and without insulating material, may also be used as described herein to effectively achieve the increased stator slot fill that may be produced by the stator construction and method of the present invention.

The motor winding process of the present invention is described in FIG. 8. This process forms the stator component described above. (100) During the motor winding process, a jig (not shown) is used to configure the wire in a desired or optimal configuration for the stator, but the wire is not inserted into the slots 32. Jigs used to insert wires into stator slots are known in the art, and these may be modified as required to fill stator slots with wires as described in connection with the present method. A portion of the wire that will be inserted into the slots may be wrapped with a slot liner material that will function as an insulator. The wire and insulating material will be arranged in a desired or optimal configuration for the stator. The arrangement of wire and insulator material essentially creates a "squirrel cage" of these materials sitting on the jig. (110) The jig should be movable from slot to slot to enable individual slots in a region of the stator core component to be spread apart one at a time. Alternatively, an entire set of slots may be moved in and out to increase spacing between slot regions. (112) Each slot 32 is placed around the wires and insulating material and filled, and the jig is moved from slot to slot to fill all of the slots in the stator core component 30. (114) The slot open end 31 adjacent to the stator core component central opening 34 may be crimped closed. The crimping does not completely seal the slot opening, but, rather, narrows the width of the open end 31 of the U-shaped slot to leave a necessary slot opening. After crimping, the slot 42 is no longer an open U-shaped, but has more of a tear drop shape. (116) The filled stator core component 30 may then be inserted into a stator ring (not shown) and sealed to form a complete stator assembly. (118)

While open slots, such as the U-shaped slots shown in FIGS. 3, 4, and 6, facilitate the assembly and repair of windings, an open slot configuration has a high air gap factor that produces a poor power factor. As a result, open slots have limited use in many kinds of motors. A slot that has an opening that is less than the width of the slot may have improved air gap characteristics; however, winding is more difficult and costly than with open slots. The open U-shaped slot configuration of the present invention combines the advantages of both open slots and semi-closed slots. The open U-shaped slots may be easily filled with conductor wire and insulation material according to the present method. Crimping the open end of the U-shaped slot produces the more advantageous air gap characteristics and power factor associated with a semi-closed slot.

As noted, a jig (not shown) is used to configure and expose sets of wires and insulating material for each slot 32 of the plurality of slots in the stator core component 30 and to fill the slots as described above. When all of the slots 32 have been wrapped around a configuration of wires and conducting material so that each slot is filled and the open ends have been crimped, the entire stator core component 30 may be squeezed or compressed, preferably in a suitable jig, to a desired final diameter. This stator core component 30 may then be inserted into a ring-shaped laminated stack or ring element, as described above, to form a complete stator assembly for installation in an electric motor with a rotor assembly and other components.

Sealing the stator core component 30 and ring element may be done with a thermoset adhesive. A preferred adhesive may be activated below a temperature that the insulating material on the wire can tolerate. After the adhesive has set, it should be able to tolerate temperatures higher than the activating temperature.

Winding stators for electric motors as described and shown herein produces a number of benefits. Greater slot fill is possible with the laminated stator core component 30 shown in the drawings and with the method of the present invention than with currently used stator core designs and motor winding methods. It is contemplated that slot fill significantly exceeding the typical 65% for random wound motors, potentially in excess of the 80% produced by some custom motors, and even approaching 100% may be achieved with the present motor winding method, and this may result in maximized torque output. Magnetic materials used in motor windings are expensive, and the present motor winding method permits more efficient use of these expensive magnetic materials than is currently possible. This can be particularly beneficial in "tooth" regions of slots in stator core components. The present motor winding method may also be used advantageously to produce formed coils for small machines that are generally random wound motors.

While the present invention has been described with respect to preferred embodiments, this is not intended to be limiting, and other arrangements and structures that perform the required functions are contemplated to be within the scope of the present invention.

INDUSTRIAL APPLICABILITY

The stator core component design and motor winding method of the present invention will find its primary applicability in the production of stator assemblies with maximized stator slot fill for electric motors.

The invention claimed is:

1. A stator assembly for an electric motor comprising:
   a. a stator core component with an outer ring section having a circumferential outer edge and a plurality of radially positioned semicircular notches spaced axially from said circumferential outer edge;
   b. a plurality of individual slot elements, each of said plurality of individual slot elements having an open U-shape in communication with a central opening in said stator assembly and a rounded bottom portion corresponding to a curvature of said semicircular notches in said stator core component, wherein each of said plurality of individual slot elements is positioned with said rounded bottom portion within each of said plurality of semicircular notches and said plurality of individual slot elements are radially spaced around said central opening and said rounded bottom portions extend axially toward said circumferential outer edge;
   c. said outer ring section of said stator core component being formed from multiple laminations of a lamination material, a single one of each of said multiple laminations having a circumferential outer edge and a plurality of radially positioned semicircular notches spaced axially from said circumferential outer edge; and
   d. said plurality of individual slot elements being formed of multiple laminations of a lamination material, each one of said multiple laminations forming said individual slot elements having said open U-shape and said rounded bottom portion corresponding to the curvature of said semicircular notches and parallel opposed side edges extending from said rounded bottom portion toward said central opening, a section of each of said parallel opposed side edge adjacent to said central opening being folded at a right angle to form teeth of said stator assembly.

2. The stator assembly of claim 1, wherein a curved outer surface of said multiple laminations forming each of said plurality of individual slot elements adjacent to said rounded bottom portion corresponds to said curvature of said semicircular notches and said curved outer surface of each said plurality of individual slot element contacts each of said plurality of semicircular notches in said outer ring section.

3. The stator assembly of claim 1, further comprising a stator ring element sealed to said stator core component to form said stator assembly.

4. The stator assembly of claim 1, wherein said lamination material forming said outer ring section is a lamination steel and said lamination material forming said plurality of individual slot elements is a lamination steel identical to or different from said lamination steel forming said outer ring section.

5. The stator assembly of claim 4, wherein said lamination material forming said multiple laminations of said outer ring section is a lamination steel different from and with a greater thickness than said lamination steel forming said multiple laminations of said plurality of individual slot elements.

6. The stator assembly of claim 4, wherein said lamination material forming said multiple laminations of said outer ring section is a lamination steel identical to and with an identical thickness as said lamination steel forming said multiple laminations of said plurality of individual slot elements.

7. The stator assembly of claim 4, wherein said lamination material forming said multiple laminations of said outer ring section is a lamination steel identical to and with a greater thickness than said lamination steel forming said multiple laminations of said plurality of individual slot elements.

8. The stator assembly of claim 4, wherein each one of said multiple laminations forming said individual slot elements is folded in a staggered or offset arrangement to form said teeth.

9. The stator assembly of claim 4, wherein each one of said multiple laminations forming said section of said parallel opposed side edges of said individual slot elements has a thickness that enables each one of said multiple laminations to be folded at a right angle to form said teeth of said stator assembly.

10. The stator assembly of claim 4, further comprising forming said stator core component and said plurality of individual slot elements of multiple laminations of a lamination steel so that the stator assembly has a variable axial thickness that increases from said central opening to said circumferential edge, wherein each of said multiple laminations forming each of said plurality of individual slot elements has a thinnest portion adjacent to said central opening folded to form said teeth of said stator assembly and a thicker portion adjacent to said rounded bottom portion, and each of said multiple laminations forming said stator core component has a thickness corresponding to said thicker portion.

11. A motor winding method that maximizes stator slot fill and facilitates wire insertion in stator slots of an electric motor stator, comprising
   a. providing an electric motor stator core assembly having a plurality of individual U-shaped slots arranged circumferentially around a central opening, each of the plurality of individual U-shaped slots having an open end in communication with the central opening and a rounded bottom end opposite the open end extending axially away from the central opening to be inserted into a corresponding curved one of a plurality of semicircular notches in an outer ring section of a stator core component, the outer ring section and the plurality of individual U-shaped slots being formed of multiple laminations of a lamination steel material, each of the multiple laminations forming the plurality of individual U-shaped slots having a profile curved to correspond with a curvature of the semicircular notches and with opposed parallel sides extending toward the open end, edges of the multiple laminations adjacent to the open ends of the plurality of individual U-shaped slots being folded to form stator teeth;
   b. providing a movable stator jig operative to fill each of the plurality of U-shaped slots with a combination of conductor wire and insulating material and forming a plurality of arrangements of combinations of conductor wire and insulating material in optimal configurations to fill each of the plurality of individual u-shaped slots on the movable stator jig;
   c. with the movable stator jig, spreading the open end of each individual U-shaped slot, filling each individual U-shaped slot with the combination of conductor wire and insulating material, and crimping the open end of each filled individual U-shaped slot to partially close the open end until all of the individual U-shaped slots have been filled and crimped; and
   d. compressing the stator core assembly with the plurality of filled and crimped individual U-shaped slots to a desired final diameter.

12. The method of claim 11, further comprising crimping the open end of each individual U-shaped slot and changing a shape of each filled and crimped individual U-shaped slot from an open U shape to a partially closed tear drop shape.

13. The method of claim 11, further comprising providing the movable stator jig with a configuration capable of supporting the plurality of combinations of conductor wire and insulating material, opening the open ends of each one of the plurality of individual U-shaped slots, filling each one of the plurality of individual U-shaped slots with a combination of conductor wire and insulating material as the jig is moved from slot to slot, and crimping the open ends of each one of the plurality of individual U-shaped slots to partially close the open end and change the shape of each of the plurality of individual U-shaped slots from a U-shape to a teardrop shape.

14. The method of claim 13, further comprising wrapping the conductor wire with a slot liner material and forming a squirrel cage arrangement of conductor wire and slot liner material on the movable stator jig in the optimal configuration to fill each of the plurality of individual U-shaped slots.

15. The method of claim 13, further comprising moving the movable stator jig to spread individual ones of the plurality of individual U-shaped slots and filling each of the individual ones of the spread slots with the combination of conductor wire and insulating material one at a time.

16. The method of claim 13, further comprising moving the movable stator jig to spread all of the plurality of individual U-shaped slots in a slot region, thereby increasing spacing between the slot regions.

17. The method of claim 11, further comprising inserting the compressed motor stator core assembly into a stator ring element or into a ring-shaped laminated stack to form a motor stator assembly and sealing the motor stator assembly.

18. The method of claim 17, further comprising inserting the compressed motor stator core assembly into a ring-shaped laminated stack formed of lamination steel and configured to contact folded edges of the multiple laminations.

19. The method of claim 17, further comprising sealing the motor stator assembly with an adhesive activated below a temperature tolerated by the insulating material.

20. The method of claim 19, further comprising sealing the motor stator assembly with a thermoset adhesive.

* * * * *